(12) United States Patent
Hamlyn et al.

(10) Patent No.: US 12,343,944 B2
(45) Date of Patent: Jul. 1, 2025

(54) METHOD FOR PRODUCING A COMPOSITE MATERIAL PART BY ORIENTED NEEDLING OF A PREFORM

(71) Applicant: CORIOLIS GROUP, Quéven (FR)

(72) Inventors: Alexander Hamlyn, Ploemeur (FR); Sophie Job, Nostang (FR)

(73) Assignee: CORIOLIS GROUP, Quéven (FR)

( * ) Notice: Subject to any disclaimer, the term of this patent is extended or adjusted under 35 U.S.C. 154(b) by 0 days.

(21) Appl. No.: 16/644,097

(22) PCT Filed: Aug. 14, 2018

(86) PCT No.: PCT/FR2018/000205
§ 371 (c)(1),
(2) Date: Mar. 3, 2020

(87) PCT Pub. No.: WO2019/043302
PCT Pub. Date: Mar. 7, 2019

(65) Prior Publication Data
US 2020/0189207 A1  Jun. 18, 2020

(30) Foreign Application Priority Data

Sep. 4, 2017 (FR) ...................................... 1770898

(51) Int. Cl.
*D04H 1/498* (2012.01)
*B29C 65/00* (2006.01)
(Continued)

(52) U.S. Cl.
CPC ............ *B29C 65/62* (2013.01); *B29C 66/721* (2013.01); *B29C 66/7294* (2013.01);
(Continued)

(58) Field of Classification Search
CPC .......... D04H 1/46; D04H 1/498; D04H 1/488; D04H 3/102; D04H 3/105; D04H 18/02; B29C 70/24
See application file for complete search history.

(56) References Cited

U.S. PATENT DOCUMENTS

| 494,910 A | 4/1893 | Wells |
| 1,100,829 A | 6/1914 | Joseph |

(Continued)

FOREIGN PATENT DOCUMENTS

| DE | 1922327 U | 8/1965 |
| DE | 3743485 A1 | 7/1989 |

(Continued)

OTHER PUBLICATIONS

PCT International Search Report for PCT/FR2018/000205, mailed Dec. 11, 2018, 4 pgs.

(Continued)

*Primary Examiner* — Scott W Dodds
(74) *Attorney, Agent, or Firm* — Pillsbury Winthrop Shaw Pittman LLP (57) ABSTRACT

A method for producing a composite material part comprising —a step of producing a preform formed of unidirectional continuous fibers oriented in at least one fiber orientation, —a step of applying non-woven filaments to the preform, and —a step of needling the filaments by means of a needling device comprising a plurality of needles, each needle being provided with a notch extending along a notch axis perpendicular to the main longitudinal axis of the needle, or several notches each extending along a notch axis perpendicular to the main longitudinal axis of the needle, the notch axes being parallel to each other, the needles and the preform being arranged so that the notch axes form a non-zero angle with the fiber orientation.

10 Claims, 4 Drawing Sheets

(51) Int. Cl.
  *B29C 65/62* (2006.01)
  *B29C 70/24* (2006.01)
  *B29C 70/48* (2006.01)
  *D04H 1/46* (2012.01)
  *D04H 18/02* (2012.01)
  *D04H 1/488* (2012.01)
  *D04H 3/10* (2012.01)
  *D04H 3/105* (2012.01)

(52) U.S. Cl.
  CPC .............. *B29C 70/24* (2013.01); *B29C 70/48* (2013.01); *D04H 1/46* (2013.01); *D04H 1/498* (2013.01); *D04H 18/02* (2013.01); *D04H 1/488* (2013.01); *D04H 3/102* (2013.01); *D04H 3/105* (2013.01)

(56) References Cited

U.S. PATENT DOCUMENTS

| | | | |
|---|---|---|---|
| 1,164,303 | A | 12/1915 | Nicewarner |
| 1,301,354 | A | 4/1919 | Baird |
| 3,206,429 | A | 9/1965 | Broyles et al. |
| 3,238,084 | A | 3/1966 | Hawkins |
| 3,265,795 | A | 8/1966 | Jonas et al. |
| 3,300,355 | A | 1/1967 | Adams |
| 3,563,122 | A | 2/1971 | De Neui |
| 3,662,821 | A | 5/1972 | Saxon |
| 3,692,601 | A | 9/1972 | Goldsworth et al. |
| 3,713,572 | A | 1/1973 | Goldsworthy et al. |
| 3,729,785 | A * | 5/1973 | Sommer ............... D04H 18/02 28/115 |
| 3,856,052 | A | 12/1974 | Feucht |
| 4,118,814 | A | 10/1978 | Holtom |
| 4,234,374 | A | 11/1980 | Frank |
| 4,242,160 | A | 12/1980 | Pinter et al. |
| 4,259,144 | A | 3/1981 | Ballentine |
| 4,309,800 | A | 1/1982 | Foster |
| 4,351,588 | A | 9/1982 | Zullig |
| 4,461,669 | A | 7/1984 | Dontscheff |
| 4,488,466 | A | 12/1984 | Jones |
| 4,562,033 | A | 12/1985 | Johnson et al. |
| 4,569,716 | A | 2/1986 | Pugh |
| 4,574,029 | A | 3/1986 | Murray |
| 4,699,031 | A | 10/1987 | D'Angelo et al. |
| 4,707,212 | A | 11/1987 | Hailey et al. |
| 4,714,509 | A | 12/1987 | Gruber |
| 4,717,330 | A | 1/1988 | Sarh |
| 4,735,672 | A | 4/1988 | Blad |
| 4,849,150 | A | 7/1989 | Kittaka et al. |
| 4,881,998 | A | 11/1989 | Youngkeit |
| 4,931,239 | A * | 6/1990 | Hosoi ...................... D04H 1/44 28/112 |
| 4,976,012 | A | 12/1990 | Mcconnell |
| 4,990,213 | A | 2/1991 | Brown et al. |
| 4,992,133 | A | 2/1991 | Border |
| 4,997,513 | A | 3/1991 | Lengen et al. |
| 5,015,326 | A | 5/1991 | Frank |
| 5,078,592 | A | 1/1992 | Grimshaw et al. |
| 5,087,187 | A | 2/1992 | Simkulak et al. |
| 5,110,395 | A | 5/1992 | Vaniglia |
| 5,200,018 | A | 4/1993 | Gill et al. |
| 5,213,735 | A * | 5/1993 | Schneider ............... D04H 1/485 28/112 |
| 5,216,790 | A * | 6/1993 | Eschenbach ............. D04H 1/46 28/112 |
| 5,290,389 | A | 3/1994 | Shupe et al. |
| 5,388,320 | A | 2/1995 | Smith et al. |
| 5,397,523 | A | 3/1995 | Curry |
| 5,447,586 | A | 9/1995 | Tam |
| 5,587,041 | A | 12/1996 | Sandusky et al. |
| 5,645,677 | A | 7/1997 | Cahuzac et al. |
| 5,700,347 | A | 12/1997 | Mccowin |
| 5,766,357 | A | 6/1998 | Packer et al. |
| 5,876,540 | A | 3/1999 | Pannel |
| 5,979,531 | A | 11/1999 | Barr et al. |
| 6,026,883 | A | 2/2000 | Hegerhorst et al. |
| 6,073,670 | A | 6/2000 | Koury |
| 6,096,164 | A | 8/2000 | Benson et al. |
| 6,251,185 | B1 | 6/2001 | Morrison et al. |
| 6,256,889 | B1 | 7/2001 | Zuro |
| 6,451,152 | B1 | 9/2002 | Holmes et al. |
| 6,458,309 | B1 | 10/2002 | Allen et al. |
| 6,490,990 | B1 | 12/2002 | Hamlyn et al. |
| 6,540,000 | B1 | 4/2003 | Darrieux et al. |
| 6,585,842 | B1 | 7/2003 | Bompard et al. |
| 6,605,171 | B1 | 8/2003 | Debalme et al. |
| 6,808,378 | B2 | 10/2004 | Wirth et al. |
| 6,995,099 | B1 | 2/2006 | Nishimura et al. |
| 7,048,024 | B2 | 5/2006 | Clark et al. |
| 7,387,147 | B2 | 6/2008 | Johnson et al. |
| 7,509,714 | B2 | 3/2009 | Rocher et al. |
| 7,819,160 | B2 | 10/2010 | Hamlyn et al. |
| 7,926,537 | B2 | 4/2011 | Hamlyn et al. |
| 8,052,819 | B2 | 11/2011 | Munaux et al. |
| 8,057,618 | B2 | 11/2011 | Hamlyn |
| 8,191,596 | B2 | 6/2012 | Hamlyn et al. |
| 8,667,999 | B2 | 3/2014 | Hamlyn et al. |
| 8,733,417 | B2 | 5/2014 | Hamlyn et al. |
| 9,144,945 | B2 | 9/2015 | Caffiau et al. |
| 11,491,741 | B2 * | 11/2022 | Hamlyn ................ B29C 70/085 |
| 2002/0014715 | A1 | 2/2002 | Wirth et al. |
| 2002/0090408 | A1 | 7/2002 | Dahl et al. |
| 2002/0152860 | A1 | 10/2002 | Machamer |
| 2003/0118681 | A1 | 6/2003 | Dahl et al. |
| 2004/0031879 | A1 | 2/2004 | Kay et al. |
| 2004/0079838 | A1 | 4/2004 | Simpson et al. |
| 2004/0103948 | A1 | 6/2004 | Scheelen et al. |
| 2005/0023414 | A1 | 2/2005 | Braun |
| 2005/0037195 | A1 | 2/2005 | Warek |
| 2005/0039844 | A1 | 2/2005 | Engwall et al. |
| 2005/0061422 | A1 | 3/2005 | Martin |
| 2005/0236735 | A1 | 10/2005 | Oldani et al. |
| 2005/0251978 | A1 * | 11/2005 | Foster .................... D04H 18/02 28/115 |
| 2006/0127635 | A1 | 6/2006 | Colson et al. |
| 2006/0162143 | A1 | 7/2006 | Nelson et al. |
| 2006/0169118 | A1 | 8/2006 | Morehead |
| 2006/0180264 | A1 | 8/2006 | Kisch et al. |
| 2006/0231682 | A1 | 10/2006 | Sarh |
| 2007/0044919 | A1 | 3/2007 | Hoffmann |
| 2007/0044922 | A1 | 3/2007 | Mischler et al. |
| 2008/0093026 | A1 | 4/2008 | Naumann |
| 2008/0105785 | A1 | 5/2008 | Griess et al. |
| 2008/0157437 | A1 | 7/2008 | Nelson et al. |
| 2008/0196825 | A1 | 8/2008 | Hamlyn |
| 2008/0202691 | A1 | 8/2008 | Hamlyn et al. |
| 2008/0216961 | A1 | 9/2008 | Hamlyn et al. |
| 2008/0216963 | A1 | 9/2008 | Hamlyn et al. |
| 2009/0139654 | A1 | 6/2009 | Wampler et al. |
| 2009/0229760 | A1 | 9/2009 | Hamlyn et al. |
| 2009/0311506 | A1 | 12/2009 | Herbeck et al. |
| 2010/0037441 | A1 * | 2/2010 | Lescostaouec ......... B29B 11/16 28/107 |
| 2010/0252183 | A1 | 10/2010 | Munaux et al. |
| 2011/0011537 | A1 | 1/2011 | Hamlyn et al. |
| 2011/0011538 | A1 | 1/2011 | Hamlyn et al. |
| 2014/0165337 | A1 | 6/2014 | De Mattia |
| 2016/0059498 | A1 | 3/2016 | Graf |
| 2016/0114540 | A1 | 4/2016 | Hamlyn et al. |
| 2017/0268141 | A1 * | 9/2017 | Sheehan ................. D04H 1/46 |
| 2018/0093433 | A1 | 4/2018 | Treiber et al. |
| 2018/0093446 | A1 * | 4/2018 | Ogale ...................... B32B 5/12 |
| 2018/0111341 | A1 | 4/2018 | Leborgne |
| 2019/0077094 | A1 | 3/2019 | Hamlyn et al. |
| 2019/0118410 | A1 | 4/2019 | Caffiau et al. |
| 2019/0224925 | A1 | 7/2019 | Hamlyn et al. |

FOREIGN PATENT DOCUMENTS

| | | |
|---|---|---|
| DE | 102007009124 A1 | 8/2008 |
| DE | 102012007439 A1 | 10/2013 |
| EP | 0116137 A1 | 8/1984 |
| EP | 0216695 A1 | 4/1987 |

(56) References Cited

FOREIGN PATENT DOCUMENTS

| | | | |
|---|---|---|---|
| EP | 0241251 | A1 | 10/1987 |
| EP | 0452186 | A1 | 10/1991 |
| EP | 0555134 | A1 | 8/1993 |
| EP | 0557158 | A1 | 8/1993 |
| EP | 0 611 741 | A1 | 8/1994 |
| EP | 0626252 | A1 | 11/1994 |
| EP | 0695823 | A2 | 2/1996 |
| EP | 0697990 | A1 | 2/1996 |
| EP | 0753394 | A2 | 1/1997 |
| EP | 0773099 | A1 | 5/1997 |
| EP | 0626252 | B1 | 3/1999 |
| EP | 1001066 | A2 | 5/2000 |
| EP | 1177871 | A2 | 2/2002 |
| EP | 1342555 | A1 | 9/2003 |
| EP | 1757552 | A2 | 2/2007 |
| FR | 1590718 | A | 4/1970 |
| FR | 2050498 | A7 | 4/1971 |
| FR | 2254428 | A1 | 7/1975 |
| FR | 2624786 | A1 | 6/1989 |
| FR | 2686080 | A1 | 7/1993 |
| FR | 2721548 | A1 | 12/1995 |
| FR | 2784930 | A1 | 4/2000 |
| FR | 2865156 | A1 | 7/2005 |
| FR | 2882681 | A1 | 9/2006 |
| FR | 2912953 | A1 | 8/2008 |
| FR | 2913365 | A1 | 9/2008 |
| FR | 2948058 | A1 | 1/2011 |
| FR | 2982793 | A1 | 5/2013 |
| FR | 2999973 | A1 | 6/2014 |
| FR | 3006938 | A1 | 12/2014 |
| FR | 3016827 | A1 | 7/2015 |
| FR | 16 70088 | | 9/2017 |
| FR | 3048373 | A1 | 9/2017 |
| FR | 16/70556 | | 3/2018 |
| FR | 3056438 | A1 | 3/2018 |
| FR | 17/70331 | | 10/2018 |
| FR | 17/70332 | | 10/2018 |
| FR | 3064523 | A1 | 10/2018 |
| FR | 3064524 | A1 | 10/2018 |
| GB | 2268705 | A | 1/1994 |
| GB | 2270672 | A | 3/1994 |
| GB | 2292365 | A | 2/1996 |
| JP | H01281247 | A | 11/1989 |
| JP | 2005007252 | A | 1/2005 |
| JP | 2005329593 | A | 12/2005 |
| WO | WO-8810154 | A1 | 12/1988 |
| WO | WO-9204492 | A1 | 3/1992 |
| WO | WO-9520104 | A1 | 7/1995 |
| WO | WO-02070232 | A1 | 9/2002 |
| WO | WO-03035380 | A1 | 5/2003 |
| WO | WO 2004/041528 | A2 | 5/2004 |
| WO | WO-2006060270 | A1 | 6/2006 |
| WO | WO 2006/069581 | A1 | 7/2006 |
| WO | WO-2006092514 | A2 | 9/2006 |
| WO | WO-2008122709 | A1 | 10/2008 |
| WO | WO-2008132299 | A2 | 11/2008 |
| WO | WO-2008149004 | A1 | 12/2008 |
| WO | WO-2009081805 | A1 | 7/2009 |
| WO | WO-2010049424 | A1 | 5/2010 |
| WO | WO-2012160270 | A1 | 11/2012 |
| WO | WO-2013030467 | A1 | 3/2013 |
| WO | WO-2013072583 | A2 | 5/2013 |
| WO | WO-2014202845 | A1 | 12/2014 |
| WO | WO-2015018801 | A1 | 2/2015 |

OTHER PUBLICATIONS

English translation PCT International Search Report for PCT/FR2018/000205, mailed Dec. 11, 2018, 3 pgs.

Evans D.O., et al., "Fiber Placement Process Study," SAMPE 34th Symposium Book of Proceedings, May 8-11, 1989, pp. 1-12.

International Search Report and Written Opinion for Application No. PCT/FR2016/000043, mailed Jul. 19, 2016, 25 pages (with English Translation).

International Search Report and Written Opinion for Application No. PCT/FR2017/000043, mailed on Jun. 26, 2016, 13 pages. (with English Translation).

International Search Report and Written Opinion for PCT Application No. PCT/FR2016/000165, mailed on Jan. 25, 2017, 18 pages. (with English Translation).

International Search Report for Application No. PCT/FR2016/000057, mailed on Jun. 20, 2016, 4 pages (with English translation).

International Search Report for Application No. PCT/FR2009/064156, mailed on Feb. 1, 2010, 2 pages.

International Search Report for Application No. PCT/FR2017/000176, mailed on Jan. 16, 2018, 7 pages (with English Translation).

International Search Report for Application No. PCT/FR2014/000135, mailed on Oct. 8, 2014, 4 pages.

International Search Report for Application No. PCT/FR2012/000195, mailed on Oct. 24, 2012, 2 pages.

International Preliminary Report on Patentability for Application No. PCT/FR2018/000205, mailed Mar. 19, 2020, 16 pages (with English Translation).

International Preliminary Report on Patentability for Application No. PCT/FR2016/000057, mailed on Oct. 12, 2017, 8 pages.

International Preliminary Report on Patentability for Application No. PCT/FR2017/000176, mailed on Apr. 11, 2019, 12 pages (with English Translation).

International Preliminary Report on Patentability for PCT Application No. PCT/FR2016/000043, mailed on Sep. 28, 2017, 8 pages.

International Search Report and Written Opinion for Application No. PCT/EP2010/054377, mailed on Jul. 2, 2010, 24 pages (with English translation).

International Search Report for Application No. PCT/FR2018/000205, mailed Dec. 11, 2018, 3 pages (With English translation).

Search Report for French Application No. 0954963, mailed on Apr. 13, 2010, 7 pages.

Search Report for French Application No. 0954964, mailed on Apr. 15, 2010, 8 pages.

Search Report for French Application No. 1154449, mailed on Jan. 10, 2012, 2 pages.

Application and File history for U.S. Appl. No. 16/336,142, filed Mar. 25, 2019. Inventors: Hamlyn et al.

Lee, Chang-Lun et al., "Resin Transfer Molding (RTIM) Process of a High Performance Epoxy Resin. I: Kinetic Studies of Cure Reaction", Polymer Engineering and Science, Apr. 2000, vol. 40, No. 4, pp. 929-934.

Office Action dated Sep. 10, 2021 corresponding to U.S. Appl. No. 16/336,152.

* cited by examiner

METHOD FOR PRODUCING A COMPOSITE MATERIAL PART BY ORIENTED NEEDLING OF A PREFORM

RELATED CASES

The present application is a National Phase entry of PCT Application No. PCT/FR2018/000205, filed Aug. 14, 2018, which claims priority from FR Patent Application No. 1770898, filed Sep. 4, 2017, which applications are hereby incorporated by reference in their entireties.

TECHNICAL FIELD

The present invention relates to a method for producing parts made of organic matrix composite material, also called polymer matrix composite material, comprising continuous unidirectional fibers and a polymer matrix.

BACKGROUND

There are known methods of producing a part of polymer matrix composite material, comprising a step of producing an initial dry preform, and a step of impregnating the dry preform with an impregnation polymer, for example by injection and/or infusion, to form a composite material part.

The dry preforms are conventionally made manually from fabrics formed by weaving continuous unidirectional dry fibers, or from multiaxial fabrics or NCF (Non Crimp Fabric) fabrics comprising several superimposed plies of continuous unidirectional fibers held together by stitching. These preforms have a high manufacturing cost, and the wastage rates during the production of parts from such prefabricated fabrics are significant.

In order to automate the operation and to limit the wastage rate, it has been proposed to produce dry preforms by automatic lay up of continuous unidirectional fibers, the resulting preforms comprising several superimposed plies of continuous unidirectional fibers. The fibers can for example be applied by contact application, by means of a roller, by a fiber placement process, each ply being formed by laying up on a mold of one or more joined bands, each formed of one or more flat fibers, ribbon type, such as carbon fibers consisting of a multitude of carbon threads or filaments. The dry preforms comprise a small amount of binder, generally less than 5%, to maintain the cohesion of the preform. However, this type of preform obtained by laying up superimposed plies may have insufficient permeability and cohesion between fibers to allow rapid and satisfactory impregnation, especially in the case of impregnation by RTM (Resin Transfer Molding) injection at high pressure and high temperature.

Furthermore, it was proposed in patent application FR16/70556, filed by the Applicant on Sep. 27 2016, a process for producing parts of composite material comprising a step of applying nonwoven filaments on a first face main of the dry preform and a step of needling said filaments by means of a needling device comprising a plurality of needles, each provided with at least one notch, so that filaments are driven by the needles and arranged in a direction substantially perpendicular to the continuous fibers of the dry preform. This process makes it possible to propose new dry preforms having excellent cohesion for their subsequent treatment, and excellent permeability. A similar process comprising the needling of preforms provided with a polymer or polymers constituting the polymer matrix of the final part has also been proposed in patent application FR16/70556, filed by the Applicant on Apr. 3, 2017.

Depending on the type of fibers used, some fiber ruptures may however appear during needling, deteriorating the preform and reducing the mechanical properties of the resulting part, and also generating fibrils harmful to operators and equipment. To reduce fiber rupture, it was proposed in patent application FR17/70332, filed by the Applicant on Apr. 3, 2017, to carry out the needling step in the presence of a lubricating agent. Each of the disclosures of the aforementioned FR16/70556, FR16/70556 and FR17/70332 are incorporated herein by reference.

SUMMARY

The purpose of embodiments of the present invention is to provide an alternative and/or complementary solution aimed at reducing, or even eliminating, the rupture of fibers during needling.

To this end, the subject of the embodiments of present invention is a process for producing a composite material part comprising continuous fibers and a polymer matrix, characterized in that it comprises a step of producing a preform formed of continuous unidirectional fibers oriented along at least one fiber orientation, a step of applying nonwoven filaments on at least a first main face of the preform, and a step of needling the filaments by means of a needling device comprising a plurality of needles, each needle being provided with a notch extending along a notch axis perpendicular to the main longitudinal axis of the needle, or of several notches each extending along a notch axes perpendicular to the main longitudinal axis of the needle, the notch axes being parallel to each other, so that filaments are driven by the needles and arranged in a direction substantially perpendicular to the continuous fibers of the preform, the needles and the preform being during needling arranged so that the notch axes form a non-zero angle with the orientation of the fiber.

The needles are driven in a back and forth motion by a driving system of the needling device, to cross the preform, preferably from one side to the other. During the movement of the needles in the direction of the preform, at least a portion of these filaments are positioned in the notches of the needles and are driven by the needles through the preform. These needled filaments positioned in the Z direction, in the thickness of the preform, stabilize the dry preform and make it possible to increase the cohesion of the preform for the subsequent step(s) of treatment of the preform, in particular to avoid delamination or unwanted displacement of fibers of the preform during a subsequent impregnation step or forming step.

During needling, the notches of the needles are filled by the filaments and the notch axes form with the fiber orientation or orientations of the plies a non-zero angle. According to embodiments of the invention, an oriented needling of the preform is carried out, by defining the orientation of the needles relative to the orientations of the fiber of the preform, so that the continuous fibers are not or are only slightly driven or damaged by the needles, thus reducing the risks of the deterioration of the preform and guaranteeing optimal mechanical properties of the final part obtained with the preform.

A high filament transfer rate can thus be obtained with a reduced needling density, which makes it possible to reduce the time required to carry out the needling step and thus to increase the production rate of the needled preforms.

The continuous fibers, preferably applied by fiber placement, are preferably continuous unidirectional fibers, for example carbon fibers, glass fibers, synthetic fibers such as aramid fibers, polyethylene fibers, and/or natural fibers, such as for example flax fibers.

The method according to embodiments of the invention can in particular be used for dry preforms such as described in the aforementioned patent application FR16/70556, the method then comprising a step of impregnation of the preform after needling, and/or for preforms provided with a polymer or polymers constituting the final matrix of the part such as described in the aforementioned patent application FR17/70331.

The method according to embodiments of the invention can advantageously be used for producing of composite material parts, in particular in the automotive or aeronautics sector.

The preform may have a single fiber orientation, the notch axes then being preferably arranged perpendicular to the fiber orientation, to within plus or minus 10°, preferably to within plus or minus 5°, more preferably to within plus or minus 2.5°.

According to one embodiment, the preform is formed of several superimposed plies, each ply being formed of continuous unidirectional fibers oriented in one fiber orientation, the preform comprising plies having at least two different fiber orientations, the needles and the preform being arranged so that the notch axes form with each of the two fiber orientations a non-zero angle during needling.

According to one embodiment, the preform comprises plies of different fiber orientations, the notch axes form with each fiber orientation a non-zero angle during needling. According to one embodiment, the notch axes are arranged along a bisector between two adjacent fiber orientations to within plus or minus 10°, preferably to within plus or minus 5°, more preferably to within plus or minus 2.5°, two fiber orientations being adjacent when the preform does not include a third fiber orientation arranged between the two said fiber orientations. The notch axes are preferably arranged along the bisector.

According to one embodiment, the fiber orientations, and the orientation of the notch axes, are defined between +90° and −90° around a reference axis, the reference axis preferably corresponding to a principal axis of the part, for example to the main load axis of the part, the notch axes are oriented in an orientation furthest from the reference axis, to within plus or minus 10°, preferably to within plus or minus 5°, more preferably to within plus or minus 2.5°. When the preform comprises at least two different fiber orientations, the notch axes are then oriented to within plus or minus 10°, preferably to within plus or minus 5°, more preferably to within plus or minus 2.5°, along the bisector forming the largest angle with the reference axis, so that the notch axes are arranged furthest from the orientation(s) closest to the reference axis.

According to one embodiment, the notch axes form an angle of at least 15° with each fiber orientation, preferably at least 22.5°.

According to one embodiment, the needling is carried out by means of a fork needle each having at its distal end at least one notch, preferably a single notch. Needling is carried out using fork needles, preferably with a needle penetration depth of between 1 and 10 mm, preferably between 2 and 6 mm. The use of fork needles makes it possible to obtain an efficient needling of the filaments, without deterioration of the fibers of the preform.

According to different embodiments, the preform is formed
- of plies with fiber orientations at 0° and 90° relative to a reference axis, the notch axes are arranged at +45° and/or −45°, preferably at +45° or −45°; or
- plies with fiber orientations at +30° and −30° relative to a reference axis, the notch axes are arranged at 0° or 90°, preferably at 90°; or
- plies with fiber orientations at 0°, 90°, +45° and −45° relative to a reference axis, the notch axes are arranged at +22.5°, −22.5°, +67.5° and/or −67.5°, preferably at +67.5° and/or −67.5°, more preferably at +67.5° or −67.5°; or
- plies with fiber orientations at 0°+60°, and −60° relative to a reference axis, the notch axes are arranged at 90°, +30°, or −30°, preferably at 90°; or
- plies with fiber orientations at 0°+30°, and −30° relative to a reference axis, the notch axes are arranged at 90°,
- the orientations of the notch axes defined above being to within plus or minus 10°, preferably to within plus or minus 5°, more preferably to within plus or minus 2.5°.

The preform can have areas with overlaps of different plies and therefore combinations of different fiber orientations from one area to another. In such a case, the orientation of the notch axes can vary from one area to another of the preform according to the combinations of fiber orientation.

According to one embodiment, the preform comprises during needling, a lubricant, also called lubricating agent, to reduce the friction between the needles and the fibers of the preform, and thus to reduce the rupture of fibers of the preform due to friction. The needles penetrate better through the preform and the transfer of filaments through the preform is thus improved. Furthermore, in the event of fiber rupture, the lubricating agent limits, even eliminates, the dispersion of the generated fibrils, the lubricating agent trapping the fibrils in the preform, by simple capillarity and/or due to the fibrils which are weighed down by the lubricating agent.

According to different embodiments,
- the lubricating agent comprises water, possibly demineralized or distilled water, or soapy water; and/or
- the preform is humidified before the needling step, the preform comprises at least 2% by weight of water, preferably at least 5% by weight of water, preferably from 5 to 40% by weight of water, more preferably from 10% to 40% by weight of water; and/or
- the lubricating agent is applied to the preform and/or the nonwoven filaments, before the needling operation, for example by spraying; and/or
- the process comprises a step of drying the preform after needling, for example by mechanical drying by pressing combined possibly with suction, and/or by passage through an oven, and/or drying by infrared, by radio frequency or by microwaves.

The dry fibers can be provided with a small amount of a first polymer, called a binder, sufficient to ensure a bonding of the different plies of the preform, the dry preform being subsequently subjected to an operation of adding said impregnation polymer to form the matrix of the final composite part.

The fibers may be provided with a quantity of first polymer sufficient to form the final matrix of the composite part, the first polymer can be a thermosetting or thermoplastic polymer, for example in the form of powder, of one or more veils and/or of threads.

According to an alternative embodiment, the continuous fibers are provided with a second polymer, forming with the first polymer the matrix or constituting a binder, laying up being performed by applying heating to heat the second polymer in order to make it tacky, the first polymer remaining little or not tacky.

According to other embodiments, the lubricating agent is present in the fibers and/or the polymer (s) used for producing the preform. According to one embodiment, the fibers and/or the polymer (s) constituting the preform are saturated with water, this water present in the fibers and/or the polymer (s) at the time of the production of the preform constituting the lubricating agent.

According to one embodiment, the lubricating agent is present in the first polymer and is an adjuvant of the internal lubricant type and/or release agent used for the processing of the polymer.

Preferably, the method comprises the production of a nonwoven preform, formed from several superimposed plies, each formed from continuous unidirectional fibers. According to one embodiment, the method comprises the production of an initial dry preform comprising several superimposed plies, the plies being formed from continuous unidirectional dry fibers, provided with a binder comprising a first polymer, the method comprising after the needling step, an impregnation step of the dry preform with an impregnation polymer, called the fourth polymer, forming the polymer matrix, for example by injection and/or infusion, to form a composite material part.

The impregnation step is preferably carried out at a temperature higher than the glass transition temperature, and preferably lower than the melting temperature of the first polymer forming the binder. Dry preforms are obtained through the application of dry fibers provided with a binder and/or by application of dry fibers without a binder, and the application of a binder, for example by spraying a liquid binder and/or spraying a binder in the form of powder, on the application surface and/or on the dry fibers previously laid. The dry preform comprises less than 10% by weight of binder, preferably less than 5% by weight of binder.

In the case of such a dry preform, the needled filaments positioned in the Z direction, in the thickness of the preform, stabilize the dry preform and make it possible to increase the cohesion of the dry preform for the subsequent step of impregnation, and thus to avoid delamination of the preform during impregnation, in particular in the case of the injection of an impregnation polymer. In addition, the perforations created by the needles and the needled filaments positioned in the Z direction increase the permeability in Z of the dry preform, in the thickness of the preform.

The impregnation is thus facilitated and can be carried out at high rates, without dry areas, and without deterioration of the preform. At the end of the impregnation step, the composite material part comprises of at least 30% by weight of impregnation polymer, the impregnation polymer constituting the matrix of the composite material part. The impregnation step can consist of an injection step of the dry preform placed in an injection mold.

The impregnation step may for example be carried out according to a wet impregnation process, a vacuum infusion process, an LCM process, an RTM, HP-RTM, Gap-RTM or VARTM process. According to one embodiment, the impregnation step consists of a step of injecting the dry preform placed in an injection mold, the injection being carried out at a pressure of at least 10 bars, for example in the order of 50 bars.

According to another embodiment, the fibers are provided with a quantity of first polymer sufficient to form the final matrix. During laying-up the first polymer is heated to ensure a bond of the various plies. After needling, the preform is subjected to a heating operation possibly combined with a forming operation to heat the whole of the first polymer and create the matrix.

According to another embodiment, the fibers are provided with a second polymer, forming with the first polymer the matrix or constituting a binder.

In the case of a second polymer forming the matrix, the matrix is formed from a majority of the first polymer, the second polymer forming for example, up to 20% by weight of the matrix. The second polymer can be in the form of powder, veil(s) and/or threads, and be present with the first polymer on the fibers before the preform is produced.

In the case of a second polymer constituting a binder, the preforms are obtained by the application of fibers provided with the first polymer and the binder and/or by the application of fibers provided only with the first polymer, and application of a binder, for example by spraying a liquid binder and/or by spraying a binder in the form of powder, on the application surface and/or on the fibers previously laid. The preform comprises less than 10% by weight of binder, preferably less than 5% by weight of binder.

According to one embodiment, the nonwoven filaments applied during the application step are formed from at least a third polymer, the impregnation step then being carried out at a temperature below the melting temperature, and preferably higher than the glass transition temperature of said third polymer, so that the filaments ensure a good holding of the fibers of the preform during the impregnation step, in particular its mechanical resistance to delamination.

The first polymer constituting a binder, the potential second polymer and the potential third polymer may be different or identical or of the same family.

According to one embodiment, the third polymer forming the binder and/or the second polymer forming the filaments is a thermoplastic polymer, preferably chosen from the group consisting of polyamides, in particular aromatic polyamides (aramids), polyesters such as polyethylene terephthalate, polyether sulfones, polyether ether ketones, phenylene polysulfides, polyurethanes, epoxides, polyolefins, polylactic acid, polyacrylics, and mixtures thereof.

In the case of a thermosetting polymer, the first polymer constituting a binder, the potential second polymer and the third polymer are for example chosen from the group consisting of epoxides, polyesters, vinyl esters, phenolics, polyimides, bismaleimides, and mixtures thereof.

The fourth impregnation polymer is different from the first polymer constituting a binder, the potential second polymer and the potential third polymer, and is preferably chosen from the aforementioned groups of polymers.

The first polymer, when it forms the matrix, is different from the potential second polymer and third polymer when they are present, and is preferably chosen from the aforementioned groups of polymers.

According to other embodiments, the nonwoven filaments applied to the preform are mineral fibers, in particular ceramic fibers such as glass fibers, carbon fibers, or metallic fibers, the filaments making it possible to reinforce the preform as well as the final part in the thickness.

According to one embodiment, the preform is obtained by a fiber placement method, known per se. According to one embodiment, the production of the preform comprises the production of superimposed plies, by contact application, by means of an application roller, of continuous fibers, preferably unidirectional on a laying up tool, each ply being produced by application of one or more bands in one direction on the laying up tool or on bands of the preceding ply, each band being formed of one or several continuous fibers.

The fiber placement is advantageously automated by means of a fiber placement head, known per se, comprising a compacting roller intended to come into contact against the tool to apply a band formed of one or more continuous flat fibers, and a guiding system for guiding one or more fibers on the roller, by relative movement of the application head relative to the laying up surface along different trajectories. The preform comprises for example from 2 to 100 superimposed plies.

The continuous unidirectional fibers are preferably in the form of flat continuous unidirectional fibers, conventionally called tows, comprising a multitude of filaments. The fibers have for example widths of one-eighth of an inch, one-quarter inch or one-half inch (⅛", ¼" or ½"). As used herein, the term «fibers» also refers to fibers of greater width, greater than ½ inch, conventionally called band in placement technology.

Alternatively, the fibers can be fixed to the mold, for example mechanically or by gluing, only at the beginning and at the end of the trajectory, the roller preferably being in contact at the beginning and at the end of the trajectory, and possibly at a distance from the surface on the rest of the trajectory.

According to other embodiments, the needling according to the invention is used as a replacement of the stitching operation performed during the manufacture of a multiaxial fabric NCF, the preform then comprises several superimposed plies, without a binder, the needling of the filaments applied to the preform is for example achieved by mechanically holding the fibers of the plies of the preform, for example by pin systems around which the fibers pass. The resulting needled preform is then subjected to an impregnation operation to form the composite material part made.

According to one embodiment, the method comprises a step of thermoforming the reinforced preform obtained after the needling step preferably between the male forming tool and the female forming tool of a press to obtain a three-dimensional preform. Alternatively, the forming is performed by means of a vacuum cover, after positioning the preform on a forming tool.

In the case of filaments made of a third polymer, the thermoforming is performed at a thermoforming temperature below the melting temperature of the third polymer, and preferably higher than the glass transition temperature of the third polymer, In the case of a dry preform with a binder formed from the first polymer, the three-dimensional preform obtained after thermoforming is subjected to an impregnation step.

The forming is preferably performed at a forming temperature below the melting temperature of the first polymer forming the matrix, of the first polymer forming the binder or of the second polymer, and preferably higher than the glass transition temperature of the first or second polymer. The forming is carried out with heat, the initial preform being heated to a forming temperature before and/or during forming in order to increase the formability of the preform. The initial preform may be preheated prior to forming by passing through an oven or tunnel and/or the preform may be heated during forming, for example by heating the male forming tool and/or the female forming tool. Preferably, the preform is only preheated by passage in an oven or tunnel, the tools of the press being not heated, thus simplifying the tools of the press.

In the absence of needling, the deformation of the preform during forming takes place fiber by fiber. The needling operation of the preform according to embodiments of the invention prior to the forming operation makes it possible to obtain a homogeneous deformation of the preform, due to the sliding of the needled filaments.

Furthermore, the filaments of the felt present on each main face of the preform allow the preform to slide in the press without sticking. The outer filaments stabilize the outer surfaces of the preform by limiting, even eliminating, the local deformations of the preform and thus ensure a homogeneous deformation of the fibers of the preform. The method according to embodiments of the invention thus makes it possible to promote the sliding mechanisms between the forming tools and the preform, and thus to limit, even eliminate, the fiber defects of the outer plies of the preforms resulting from friction between the preform and the forming tools in the previous forming processes.

The initial preform can be two-dimensional, obtained by laying up on the flat surface of a tool, or three-dimensional, the forming can then be carried out to obtain three-dimensional parts of a complex form that cannot be obtained by laying up, particularly by fiber placement.

The needling density is defined in particular according to the required permeability and stabilization, and the type of needle used. According to one embodiment, the needling density during the needling step is between 10 and 350 punches/cm$^2$. In the case of a needling device equipped with forked needles, the needling density is preferably from 150 to 350 punches/cm$^2$, more preferably from 200 to 300 punches/cm$^2$. In the case of a needling device provided with barbed needles, each comprising a plurality of notches, the needling density is preferably from 10 to 100 punches/cm$^2$, more preferably from 40 to 60 punches/cm$^2$.

The working part of the needles preferably has a diameter of between 0.30 and 0.60 mm, preferably between 0.40 and 0.50 mm (gauges 38 to 42).

The width and/or depth of the notches, preferably the width and the depth of the notches, are between 0.03 and 0.1 mm, preferably between 0.04 and 0.06 mm.

The length of the filaments is defined according to the thickness of the preform, preferably in such a way that the needled filaments pass through the preform. Furthermore, the needled filaments should preferably be long enough to remain entangled on the first face of the preform, and thus ensure better stability of the preform.

According to one embodiment, the filaments applied on the preform have a length of between 10 and 100 mm, preferably between 40 and 60 mm, and a diameter of between 5 and preferably 10 to 35 μm.

According to one embodiment, the needling is carried out so that filaments transferred by the needles protrude from the second main face of the preform which is opposite to the first main face on which the filaments have been applied, over a length between 1 and 10 mm, preferably 2 to 6 mm, some of these filaments being able to form loops protruding from the second face of the preform.

According to one embodiment, the step of applying filaments comprises applying a non-woven veil or felt formed from the filaments. The felts used can be isotropic, with filaments randomly oriented, or oriented felts with filaments having a preferential orientation. In the case of oriented felts, the needles, and more particularly their notch axes, are arranged as a function of the orientation of the filaments so as to optimize the rate of uptake of filaments by the needles, the notch axes forming preferably a zero angle with the preferential orientation of the filaments of the felt. According to one embodiment, the felt has a surface mass of 5 to 100 g/m², and/or the preform provided with filaments comprises from 1 to 10% by weight of filaments, preferably from 2 to 5% by weight of filaments.

A part of the filaments of the felt is transferred through the preform, the non-transferred filaments present on the first main face may be removed by peeling the felt or not.

According to one embodiment, the remainder of the felt is held on the preform for the impregnation step, the nonwoven structure of the felts increases the permeability of the preform and thus makes it possible to promote the infusion and/or injection, the felts conferring a draining effect, more particularly in the case of an infusion. Felt may further increase the impact strength of the preform and/or improve the surface appearance of the preform.

The subject of the invention is also a reinforced needled preform such as obtained at the end of the needling step in the method previously described, as well as a composite material part such as obtained according to the method previously described, from one or more reinforced needled preforms.

BRIEF DESCRIPTION OF THE DRAWINGS

The invention will be better understood, and other objectives, details, characteristics and advantages will appear more clearly in the following detailed explanatory description of currently preferred embodiments of the invention, with reference to the schematic drawings annexed thereto, in which.

Figure 1:
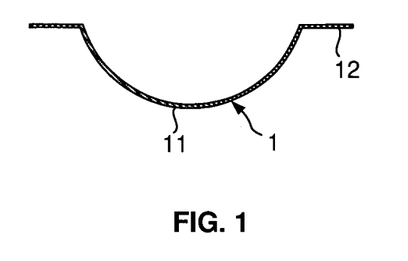
FIG. 1 is a schematic sectional view of an example of a three-dimensional composite material part produced according to the method according to embodiments of the invention.

FIG. 1 illustrates an example of a three-dimensional composite material part 1 that can be produced according to a method of the invention, comprising the laying up of continuous fibers to form a flat dry preform, the application of a felt of non-woven fibers to the preform and needling of the felt, the forming of the preform then its impregnation. The part presented here has the shape of a spherical cap 11 with an annular rim 12.

Figure 2:
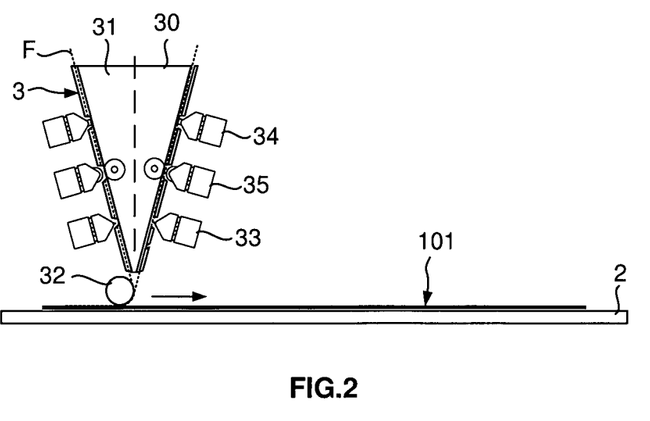
FIG. 2 is a schematic side view illustrating the laying-up operation of the initial dry preform.
Figure 4:
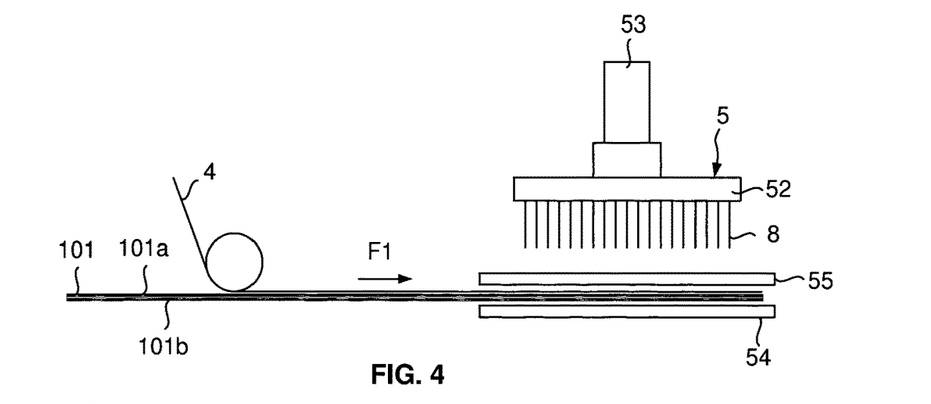
FIG. 4 is a schematic side view illustrating the needling operation of a non-woven fiber felt applied to the preform.

In a first step, such as illustrated in FIG. 2, plies of unidirectional continuous fibers are laid up flat on a laying up tool 2 in different orientations, to form an initial two-dimensional dry panel or preform 101 presenting two main opposing faces 101a, 101b (FIG. 4).

Laying up is carried out by means of a laying up device 3 comprising a fiber placement head 30, known per se, allowing automatic contact laying up of bands formed of one or more fibers. The fibers F enter the head 3 in the form of two layers of fibers, and the head comprises a guiding system 31 for guiding the fibers to the compacting roller 32 in the form of a band of fibers in which the fibers are arranged side by side, for example substantially edge to edge. The head comprises, on either side of the guiding system, cutting means 33 for individually cutting each fiber passing through the guiding system, blocking means 34 for blocking each fiber that has just been cut, and feeding means 35 to individually feed each fiber, in order to be able to stop and resume the application of a fiber at any time, as well as to choose the width of the band. The laying up of a band is achieved by relative movement of the head in relation to the substantially planar layup surface of the layup tool. The head comprises for example a support structure (not shown) on which is mounted the guiding system and by which the head can be assembled to a displacement system, adapted to move the head in at least two directions perpendicular to each other. The head is for example designed to receive eight fibers, and allow the application of bands of 1 to 8 fibers of 6.35 mm (¼ inch) wide.

The head is here used for the production of a dry preform, from dry fibers provided with a binder, to give a tackiness to the fibers during the laying up and ensure the cohesion of the preform. The binder, consisting of a polymer, may be applied to the fibers prior to laying up, for example in the form of a veil and/or powder, bobbins of fibers pre-provided with the binder being loaded into the fiber placement machine. The binder may be applied on line, during the laying up of the fibers, for example directly on the fibers to be laid, for example in the form of filaments, as described in the French patent application No. 16 70088, filed Mar. 7, 2016 and entitled «Process for producing preforms with application of binder on dry fiber, and corresponding machine».

In the particular case of fibers pre-provided with binder, the head 3 is preferably equipped with a heating system (not shown), for example of the IR lamp or laser type, in order to heat the binder during the application of the fibers, and thus allow at least an adhesion of the fibers of the different plies. The heating system heats the fibers before they are applied to the application surface, as well as the application surface or the fibers previously laid, upstream of the roller relative to the direction of the advancement of the head.

The fibers are, for example, continuous flat carbon fibers, of the tows type, comprising a multitude of threads or carbon filaments, with a thermoplastic binder present in an amount of about 2% by weight.

The preform is formed of plies with different fiber orientations, the orientations being conventionally defined relative to a reference axis X, conventionally corresponding to a main axis of the part to be produced, and possibly to the main load axis of the part.

The fiber orientations at a and (α±180°) are equivalent. Conventionally, the fiber orientations are defined between +90° and −90° relative to the X axis, the fiber orientations at +90° and −90° being equivalent.

For example, the preform is formed of eight plies of fibers, according to the following laminate sequence +45°/−45°/0°/90°/90°/0°/−45°/+45°.

Figure 3:
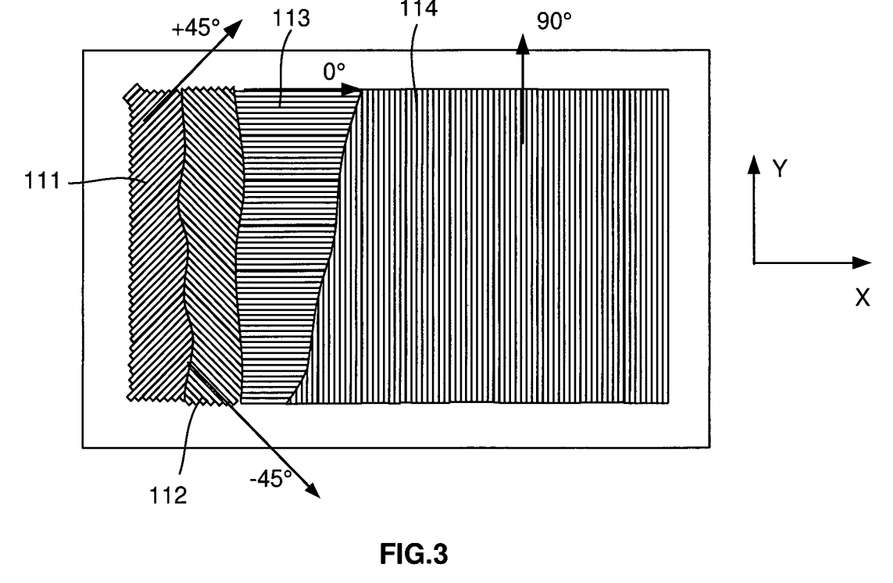
FIG. 3 is a schematic top view of the preform obtained after laying-up the first four plies, on which the plies are partially shown to illustrate the orientation of said plies.

FIG. 3 schematically illustrates the fiber orientations of the first four plies laid:
 a first ply 111 with a first orientation at +45°;
 a second ply 112 with a second fiber orientation at −45°;
 a third ply 113 with a third fiber orientation at 0°, and,
 a fourth ply 114 with a third fiber orientation at 90°.

After producing the preform, a felt 4 of nonwoven filaments or fibers 40 is applied to a first main face 101a of the dry preform, and the preform thus equipped with the felt is subjected to a needling operation, such as schematically illustrated in FIG. 4, by passing through a needling device or needler 5.

The needling device 5, known per se for consolidating mats of fibers, comprises a plurality of needles 8 mounted on a support 52 or needle board, able to be driven, by appropriate means 53, with a back and forth movement in a direction parallel to the needles. The needling device comprises a perforated support table 54 arranged facing the needles and intended to support the preform, and a stripper plate or stripper device 55 placed between the support table and the needles, provided with through holes for the passage of the needles. The support table also includes a set of holes to allow for the passage of the needles after they have passed through the preform.

Figure 5:
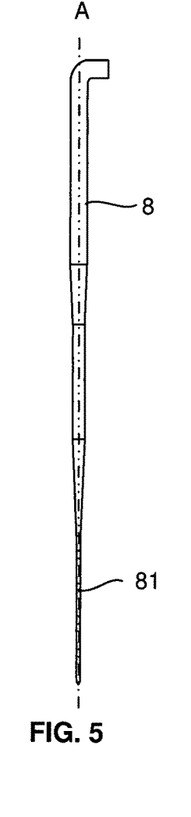
FIG. 5 is a schematic view of a fork needle that can be used in the needling device.
Figure 6A:
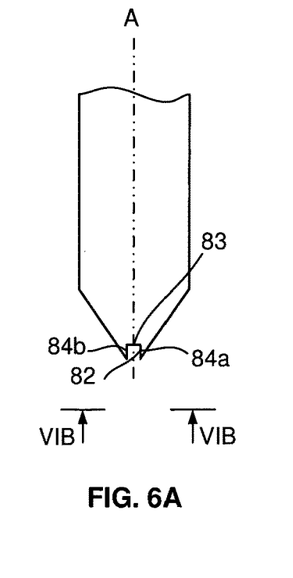
FIG. 6A is a partial enlarged view of FIG. 5
Figure 6B:
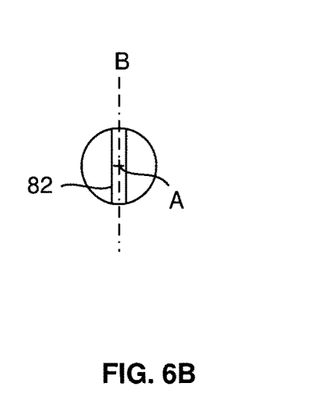
FIG. 6B is a view along the plane VIB-VIB of FIG. 6A.

The needling device is here equipped with the forked 8 needles, of longitudinal axis A, such as illustrated in FIGS. 5, 6A and 6B, each needle comprising at the end of its distal portion or working part 81 a notch 82, so that the needle drives the filaments only during the penetration phase, from top to bottom in FIG. 4. The notch 82 is defined between a bottom wall 83 and two side walls 84a, 84b and has an axis B, called notch axis, arranged parallel to said walls 83, 84a, 84b, and perpendicular to the longitudinal axis A of the needle.

Figure 7:
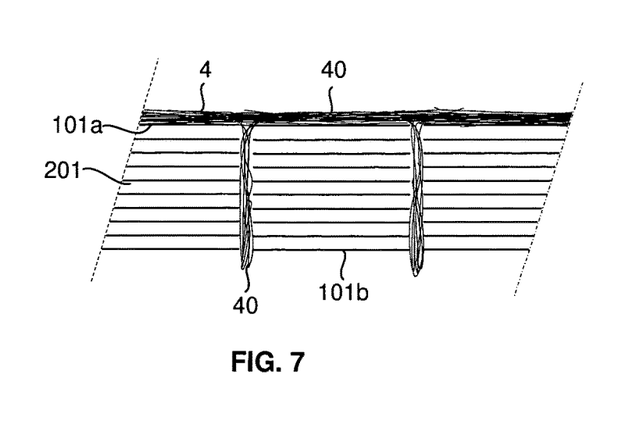
FIG. 7 is a partial schematic sectional view of the preform after needling.

During needling, the preform is driven positively in the direction of the arrow referenced F1, and the needles are driven back and forth. When moving the needles downwards, fibers of the felt are positioned in the notches 51b of the needles and are driven through the entire thickness of the preform, the filaments emerging on the second main face 101b, such as schematically illustrated in FIG. 7. The needling density is defined according to the frequency of the back and forth movement of the needles, the number of needles, and the advancement speed of the preform in the needling device.

According to an embodiment of the invention, the needling is carried out so that the notch axes make a non-zero angle with the orientations of the fiber of the plies.

Figure 8:
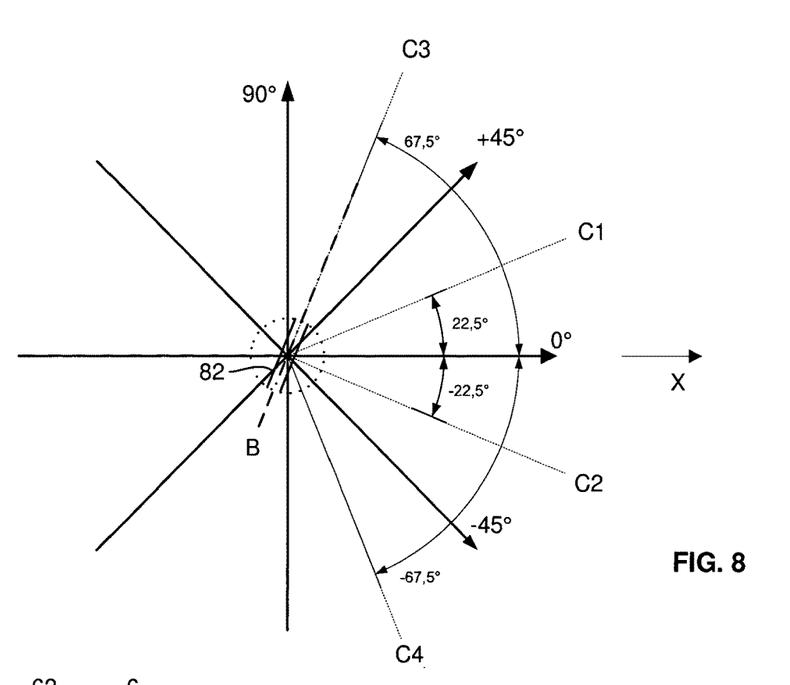
FIG. 8 is a schematic view illustrating the orientation of the notches of the needles relative to the orientations of the fiber at 0°, +45°, −45° and 90° of the plies of the preform.

With reference to FIG. 8, the notch axes B are preferably arranged along a bisector of the angle between two adjacent orientations, that is to say
 along the bisector C1 of the angle between the fiber orientations at 0° and +45°, arranged at 22.5° from the X axis;
 along the bisector C2 of the angle between the fiber orientations at 0° and −45°, arranged at −22.5° from the X axis;
 along the bisector C3 of the angle between the fiber orientations at +45° and 90°, arranged at 67.5° from the X axis; and/or
 along the bisector C3 of the angle between the fiber orientations at −45° and −90°, arranged at −67.5° from the X axis.

According to one embodiment, all the needles are identical and are mounted in the same way on the needle board, the notch axes of the needles all having the same orientation.

In the case of a main fiber orientation at 0°, corresponding to the main load axis X of the part, the notch axes are oriented at +67.5° or −67.5°, for example at 67.5° such as illustrated in FIG. 8, in order to obtain a maximum angle between the notch axes and the fibers oriented at 0°, and thus to limit as much as possible the risks of breakage of these fibers oriented at 0°.

The orientation of the notch axes relative to the fiber orientations of the preform is for example obtained by appropriately orienting the preform entering a needling device whose position is fixed.

Preferably, before the needling operation, a lubricant, also called a lubricating agent, is applied to the dry preform. The lubricating agent comprises water and is applied by a spray system on the preform.

During needling, the water present in the preform as a lubricating agent reduces the friction between the needles and thus reduces the heating of the preform, which guarantees an efficient transfer of the felt filaments through the preform, this limits the breakage of the fibers, and makes it possible to trap in the preform any possible fibrils resulting from the breakage of fibers. After needling, the preform is advantageously subjected to a drying operation in order to reduce the water content of the preform or remove any trace of water in the preform. This drying operation is for example carried out by placing the preform in an oven.

After needling, the rest of the felt formed by the filaments present on the first face which have not been needled can be kept on the preform or be removed. According to one embodiment, the needling density and the penetration depth of the needles, which is equal to the distance between the end of the needle and the second main face of the preform, are defined so that the preform has a quantity of filaments, preferably similar, on each of its faces, these filaments on the surface increasing the permeability of the preform, and facilitating in addition the forming operation.

According to an alternative embodiment, the filaments are not applied in the form of a felt, but projected in a random manner on the first face of the preform.

Figure 9:
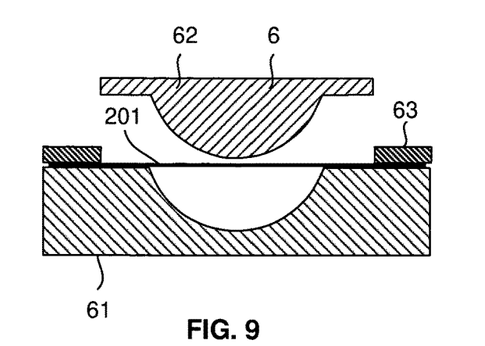
FIGS. 9 and 10 are sectional views of the press illustrating the forming operation of the preform obtained after needling.

The preform provided with needled filaments, called reinforced preform 201, is then transferred to a press for the forming operation, also called a stamping operation. Such as illustrated in FIG. 9, the press 6 comprises a female forming tool 61 or matrix, having a recess whose shape corresponds to that of the spherical cap 12 of the preform to be produced, and a male forming tool 62, or punch, comprising a boss of complementary shape. The forming is performed by bringing closer together the male forming tool and the female forming tool, from an open position of the press illustrated in FIG. 9 towards a closed position of the press illustrated in FIG. 10.

Figure 10:
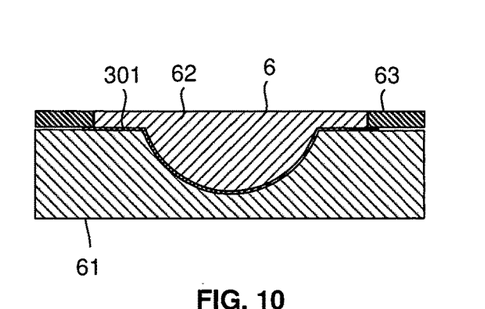

The forming is carried with heat, the preform being at a forming temperature between the glass transition temperature and the melting temperature of the polymer constituting the binder, and between the glass transition temperature and the melting temperature of the polymer forming the filaments of the felt. This forming temperature of the preform is obtained by preheating the preform before positioning in the press and/or by heating the two tools 61, 62. This preheating is for example carried out by passing the initial preform between the upper and lower ramps of the infrared lamps of an oven or preheating tunnel. Preferably, during forming, the preform is kept under tension by a tensioning system, for example of the blank holder type, such as shown schematically under the reference 63. The tools 61, 62 are then spaced one from another in the open position to demold the reinforced three-dimensional preform 301 from the press.

Figure 11:
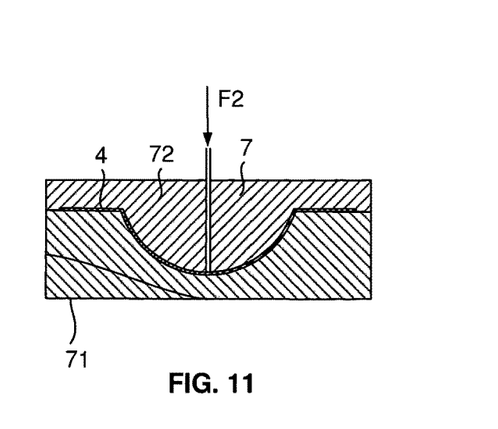
FIG. 11 is a schematic sectional view of the injection mold illustrating the injection operation of the preform obtained after thermoforming.

The resulting three-dimensional reinforced preform 301 is then subjected to an operation of adding or impregnating a thermosetting or thermoplastic impregnation polymer, by an injection and/or infusion process. With reference to FIG. 11, the three-dimensional reinforced preform is for example placed in an injection mold 7, between the male part and the female part of the mold, an impregnation polymer is injected under pressure into the preform, according to a RTM (Resin Transfer Molding) or Gap-RTM method, such as schematically illustrated by the arrow referenced F2. The composite part 1 obtained at the end of this impregnation step may be subjected to a trimming operation.

Figure 12:
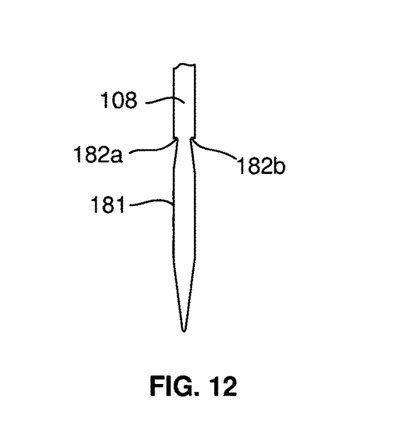
FIG. 12 is a view similar to that of FIG. 6A illustrating a barbed needle that can be used in the needling device.

Alternatively, the needling device is equipped with forked needles comprising several notches at its end. According to another embodiment, the needling device is equipped with said barbed needles 108, such as illustrated in FIG. 12, comprising along its distal portion or working portion 181 one or more notches, oriented in the direction of the end of the needle, for example two notches 182a, 182b, arranged symmetrically on either side of the longitudinal axis, and whose notch axes are arranged in parallel.

For example, a part is produced according to the following process:

Laying up: Laying up of a preform by placement of carbon fibers provided with a binder applied in line, formed of a thermoplastic copolyester having a melting point of around 130° C., and a glass transition temperature of around 15° C., the preform being produced by laying eight plies of fibers in different orientations, according to the following laminate sequence: +45°/−45°/0°/90°/90°/0°/−45°/+45°.

Humidification: application of water on the preform, the resulting preform comprising 30% by weight of water.

Application: Application of a non-woven felt made of filaments or polyester fibers 14 μm in diameter, with a length of 40 to 60 mm, and a melting point of about 200° C., said felt, of isotropic orientation, having a surface mass of 50 g/m².

Needling with forked needles, having a working part of gauge 42 (0.40 mm), having a notch or fork at the end, 0.05 mm in depth and 0.05 mm in width, with a needling density of 200 punches/cm² and a penetration depth of 5 mm, the notch axes being oriented at 67.5° from the X axis.

drying: drying of the preform by passage in an oven above 100° C.

Forming: forming at a forming temperature of 120° C.

Injection: injection of the type gap-RTM of a thermosetting epoxy polymer in a three-minute cycle with a first phase of compression and heating to 120° C. for about 2 minutes, and a second injection and polymerization phase at 50 bars, put under vacuum, for about 1 minute.

Figure 13:
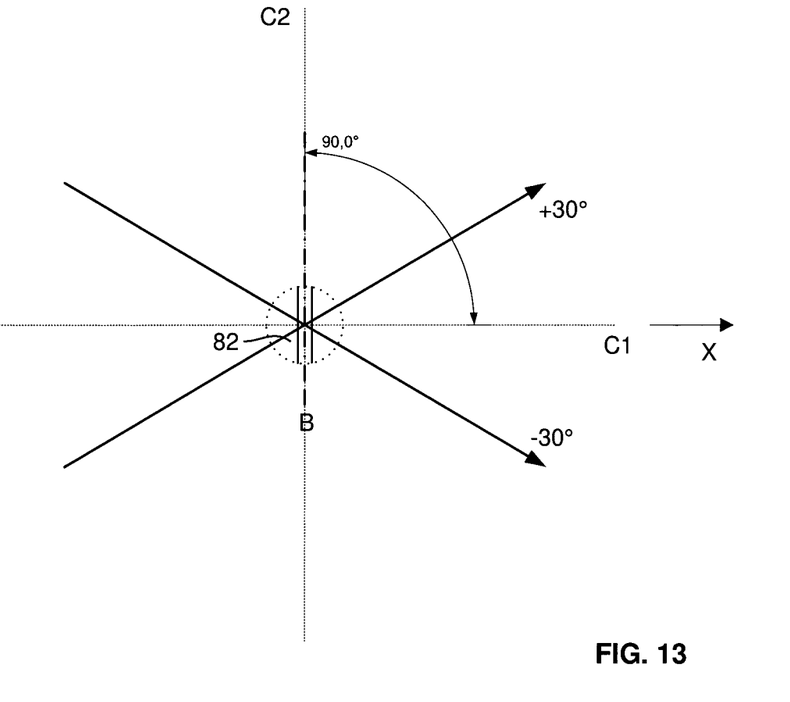
FIG. 13 is a view similar to FIG. 8, illustrating the orientation of the notches of the needles relative to the fiber orientations of the fiber at +30° and −30° of another preform; and, FIG. 14 is a view similar to FIG. 8, illustrating the orientation of the notches of the needles relative to the fiber orientations at 0, +60° and −60° of another preform.

FIG. 13 illustrates the orientation of the notch axes B during needling in the case of a preform formed of plies with fiber orientations at +30° and −30°. According to the invention, the notch axes B are arranged along a bisector of the two adjacent orientations, that is to say along the first bisector C1 between the fiber orientations at 30° and +30°, arranged at 0° from the X axis;

along the second bisector C2 between the fiber orientations at 30° and +30°, positioned at 90° from the X axis.

Such as illustrated in FIG. 13, the notch axes B are preferably arranged so that the angle with the reference axis is the maximum, that is along the second bisector at 90°.

Figure 14:
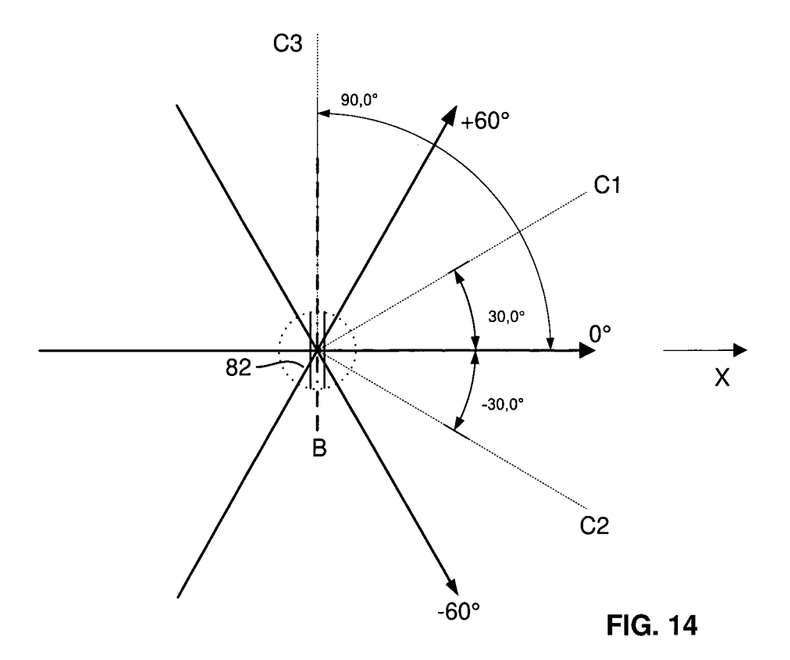

FIG. 14 illustrates the orientation of the notch axes B of a preform formed of plies with fiber orientations at 0°, +60° and −60°. The notch axes B are then arranged along a bisector of two adjacent orientations, that is to say along the bisector C1 between the fiber orientations at 0° and 60°, at 30° from the X axis;

along the bisector C2 between the fiber orientations at 0° and −60°, at −30° from the X axis; and/or along the bisector C3 between the fiber orientations at −60° and +60°, at 90° from the X axis.

Such as illustrated in FIG. 14, the notch axes B are preferably arranged so that the angle with the reference axis is the maximum, that is along the bisector C3 at 90°.

Although the invention has been described in connection with various particular embodiments, it is obvious that it is not limited thereto and that it includes all the technical equivalents of the means described as well as their combinations if they are within the scope of the invention.

The invention claimed is:

1. A method for producing a composite material part comprising continuous unidirectional fibers and a polymer matrix, comprising:

a step of producing a preform formed of several superimposed plies, each ply being formed by continuous unidirectional fibers oriented along one fiber orientation to present a unidirectional fiber direction for each ply, said preform comprising plies of different fiber orientation such that different plies present different unidirectional fiber directions;

a step of applying a non-woven felt comprising non-woven filaments to at least a first main face of the preform, the non-woven felt having a surface mass of between 5 g/m² and 100 g/m² and the non-woven filaments having a diameter of between 5 μm and 50 μm; and a step of needling said non-woven filaments by means of a needling device comprising a plurality of forked needles, each forked needle being provided at its distal end with a notch extending along a notch axis perpendicular to the main longitudinal axis of the forked needle, so that the non-woven filaments are captured by the notch and are driven by the forked needles through the preform to intermingle with the unidirectional fibers and are arranged within the preform in a known pattern by the step of needling the captured non-woven filaments in a direction substantially perpendicular in the z direction, wherein the captured non-woven filaments are driven and remain substantially perpendicular in the z direction relative to the plies of continuous fibers of the preform, said forked needles and the preform being arranged so that the notch axes form a non-zero angle with each fiber orientation during needling, wherein the notch axes orientation relative to the continuous unidirectional fibers minimizes driving or damaging the fibers of each superimposed ply layer, wherein each forked needle has a diameter of between 0.30 mm and 0.60 mm, wherein the notch has a width and a depth of between 0.03 mm and 0.1 mm, and wherein a needling density of the needling device is between 150 punches/cm$^2$ and 350 punches/cm$^2$; and a step of impregnating the dry preform with an impregnating polymer to form the composite material part, the impregnating polymer constituting the polymer matrix of the composite material part.

2. The method according to claim 1, wherein the notch axes are arranged substantially along a bisector of two adjacent fiber orientations, to within plus or minus 10°, preferably to within plus or minus 5°, more preferably to within plus or minus 2.5°.

3. The method according to claim 1, wherein the fiber orientations are defined between +90° and −90° around a reference axis relative to the notch axis, the notch axes are oriented in an orientation furthest from the reference axis.

4. The method according to claim 1, wherein the notch axes form an angle of at least 15° with each fiber orientation, preferably at least 22.5°.

5. The method according to claim 1, wherein the preform is formed
- of plies with fiber orientations at 0° and 90° relative to a reference axis, the notch axes are arranged at +45° and/or −45°, preferably at +45° or −45°; or
- plies with fiber orientations at +30° and −30° relative to a reference axis, the notch axes are arranged at 0° or 90°, preferably at 90°; or
- plies with fiber orientations at 0°, 90°, +45° and −45° relative to a reference axis, the notch axes are arranged at +22.5°, −22.5°, +67.5° and/or −67.5°, preferably at +67.5° and/or −67.5°, more preferably at +67.5° or −67.5°; or
- plies with fiber orientations at 0°, +60° and −60° relative to a reference axis, the notch axes are arranged at 90°, +30°, or −30°, preferably at 90°, or
- plies with fiber orientations at 0°, +30° and −30° relative to a reference axis, the notch axes are arranged at 90°.

6. The method according to claim 1, wherein it comprises the production of a dry preform comprising several superimposed plies, said plies being formed from continuous dry fibers provided with a binder, said binder comprising a first polymer.

7. The method according to claim 1, wherein the production of the preform comprises the production of superimposed plies, by application by contact, by means of an application roller, of continuous fibers on a laying up tool, each ply being produced by applying one or several bands along an orientation on the laying up tool or on bands of the preceding ply, each band being formed of one or several continuous fibers.

8. The method according to claim 1, wherein the preform comprises at least 5% by weight of water, preferably from 5 to 40% by weight of water, more preferably from 10 to 40% by weight of water.

9. The method according to claim 1, wherein it comprises a step of drying the preform after needling.

10. The method according to claim 1, wherein the preform comprises during needling a lubricating agent to reduce friction between the needles and the fibers of the preform, the lubricating agent comprising water, the preform comprising at least 2% by weight of water.

* * * * *